Patented Nov. 14, 1922.

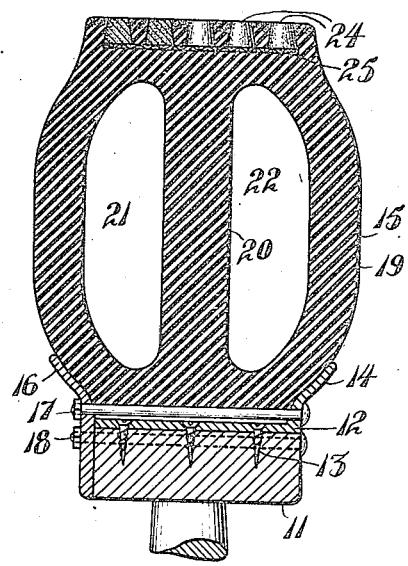
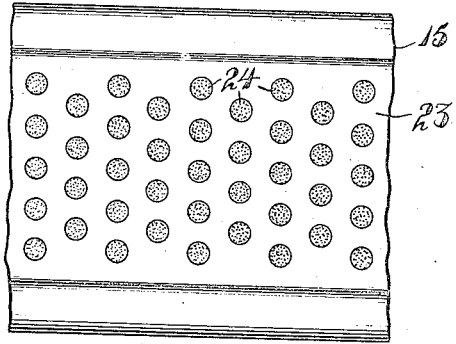
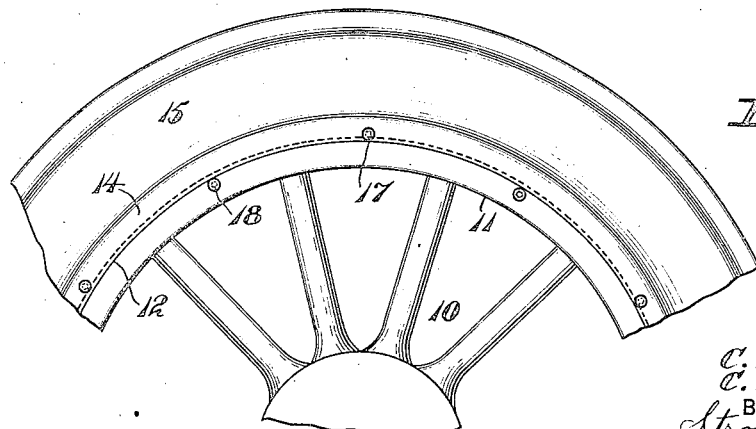

1,435,566

UNITED STATES PATENT OFFICE.

CORNELIUS L. VANDERLEY AND CARL J. JORGENSEN, OF SAN FRANCISCO, CALIFORNIA.

PNEUMATIC TIRE.

Application filed March 20, 1919. Serial No. 283,712.

*To all whom it may concern:*

Be it known that we, CORNELIUS L. VANDERLEY and CARL J. JORGENSEN, citizens of the United States, residing at the city and county of San Francisco and State of California, have invented new and useful Improvements in Pneumatic Tires, of which the following is a specification.

This invention relates to a tire.

It is the principal object of the present invention to provide an improved tire structure embodying an antifriction tread surface and permanent pneumatic air chambers, said tire being fitted for detachably mounting upon a vehicle wheel.

The present invention contemplates the use of an annular tire casing, having continuous separate air compartments extending completely around the tire and divided by an intermediate partition wall, the tread surface of the tire being formed with special anti-skid members.

The invention is illustrated by way of example in the accompanying drawings, in which—

Fig. 1 is a view in transverse section through the tire and the wheel felly.

Fig. 2 is a fragmentary view in elevation, showing the tread surface.

Fig. 3 is a fragmentary view in side elevation, showing the manner in which the tire is mounted upon the wheel.

Referring to the drawings, 10 indicates a vehicle wheel having a felly 11. Fixed upon this felly is a permanent tire rim 12, secured in place by screws 13. The body portion of this rim is in the form of an annular band circumscribing the felly. One of the marginal edges of this band is turned outwardly and forms a flange 14 and this flange extends along one side of a tire 15. The opposite side of the tire is engaged by an adjustable rim 16 having a flange identical with the flange 14. This last named flange is secured in position by two sets of bolts 17 and 18.

As shown in Fig. 3, the bolts are staggered in relation to each other, the bolts 18 extending through the body of the wheel felly and the bolts 17 extending through the flanges of the clamping members and in tranverse grooves formed on the inner circumferential surface of the tire, as shown in Fig. 1. This arrangement insures that the tire will be held rigidly in place and will be prevented from creeping circumferentially of the wheel.

Reference being had to Fig. 1, it will be noted that the tire comprises an outer wall structure 19, substantially elliptical in cross section and subdivided centrally and circumferentially by means of a partition wall 20. This arrangement forms complementary air cushion compartments 21 and 22 which are filled with air at atmospheric pressure and permanently sealed, and this, with the three parallel elastic cushion walls, provides a tire strongly resistant to compression.

The outer circumference of the tire is formed with a tread 23. This tread consists of a plurality of non-skid plugs 24, mounted upon a fabric band 25; the band and plugs being embedded within the rubber of the tire. In order to provide a maximum anti-skidding effect the plugs 24 are preferably formed of carborundum. These plugs are frusto-conical in shape and their enlarged base portions rest directly upon the fabric strip. This arrangement insures that the rubber of the tread will completely surround the plugs and hold them in position while exposing the small ends of the plugs, as shown in Fig. 2. It will also be understood that the tread 23 might be made of a composition of rubber and carborundum or sand without departing from the spirit of the invention.

In the operation of the tire, the load will be supported upon the air within the compartments 21 and 22 and will be assisted in this action by the opposite side walls of the casing and the central partition wall 20. Due to the peculiar formation of the air chambers and the interposed partition wall a desirable resilient action of the tire will be obtained.

In use, the anti-skid plugs 24 will securely engage the ground and will prevent skidding. It will thus be seen that the tire here disclosed while decidedly simple in its construction yet insures that a substantial puncture-proof tire will be provided having all the qualities of a pneumatic tire and with the additional desirable anti-skid features.

While we have shown the preferred form of our invention as now known to us, it will be understood that various changes in the construction, arrangement and combination of parts may be made by those skilled in the art without departing from the spirit of the invention as claimed, and it is to be further understood that other gritty substance than carborundum may be used.

Having thus described our invention, what we claim and desire to secure by Letters Patent is—

A vehicle tire comprising a tread portion, a rim portion, side walls, a central rib, the said side walls and rib being in parallelism and being formed integrally with the tread and rim portions, whereby two parallel hermetically sealed air compartments are formed between the side walls and the rib, said air compartments coacting with the side walls and rib to resist compression.

In testimony whereof we have hereunto set our hands in the presence of two subscribing witnesses.

CORNELIUS L. VANDERLEY.
CARL J. JORGENSEN.

Witnesses:
GEO. GALE,
ED. WEBER, Jr.